(12) United States Patent
Lee

(10) Patent No.: US 8,355,700 B2
(45) Date of Patent: Jan. 15, 2013

(54) METHOD AND MOBILE TERMINAL FOR RAPIDLY SEARCHING FOR MESSAGES RECEIVED FROM OR SENT TO SAME PHONE NUMBER

(75) Inventor: Il-Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1011 days.

(21) Appl. No.: 11/832,495

(22) Filed: Aug. 1, 2007

(65) Prior Publication Data

US 2008/0032751 A1    Feb. 7, 2008

(30) Foreign Application Priority Data

Aug. 2, 2006    (KR) .................. 10-2006-0072968

(51) Int. Cl.
*H04L 12/58*    (2006.01)
(52) U.S. Cl. .................. 455/412.1; 455/412.2; 455/413; 455/550.1; 455/566; 455/567; 379/88.11; 379/88.12; 379/88.22; 379/88.23
(58) Field of Classification Search .................. 455/566, 455/412.1–413, 550.1, 567; 379/88.11, 88.12, 379/88.22, 88.23
See application file for complete search history.

(56) References Cited

U.S. PATENT DOCUMENTS

| | | | |
|---|---|---|---|
| 6,424,829 B1 * | 7/2002 | Kraft | 455/412.1 |
| 2004/0137955 A1 * | 7/2004 | Engstrom et al. | 455/566 |
| 2005/0020246 A1 * | 1/2005 | Kang | 455/412.1 |
| 2005/0210146 A1 | 9/2005 | Shimizu | |
| 2007/0256025 A1 * | 11/2007 | Yen et al. | 715/764 |

FOREIGN PATENT DOCUMENTS

| | | |
|---|---|---|
| JP | 2005-352566 | 12/2005 |
| KR | 1020020018701 | 3/2002 |
| KR | 1020030063062 | 7/2003 |
| KR | 1020040033727 | 4/2004 |
| KR | 1020050005316 | 1/2005 |

OTHER PUBLICATIONS

Palmone: "Using your Treo 650 Smartphone by palmOne (includes setup information and instructions for most tasks)", 2004.

* cited by examiner

*Primary Examiner* — Dwayne Bost
*Assistant Examiner* — Yungsang Lau
(74) *Attorney, Agent, or Firm* — The Farrell Law Firm, P.C.

(57) ABSTRACT

Disclosed are a method and a mobile terminal for easily and rapidly searching for messages received from or sent to the same phone number of a currently displayed message. The method includes a first step of detecting whether a user inputs a key to select a previous or next message received from or sent to the same phone number of a currently displayed message; a second step of searching for the previous or next message received from or sent to the same phone number upon detecting the user's key input; and a third step of displaying the detected message on a display unit of the mobile terminal.

20 Claims, 6 Drawing Sheets

METHOD AND MOBILE TERMINAL FOR RAPIDLY SEARCHING FOR MESSAGES RECEIVED FROM OR SENT TO SAME PHONE NUMBER

PRIORITY

This application claims priority to an application entitled "Method and Mobile Terminal for Rapidly Searching for Short Messages Received From or Sent to Same Phone Number" filed with the Korean Intellectual Property Office on Aug. 2, 2006 and assigned Serial No. 2006-72968, the disclosure of which is incorporated herein by reference.

BACKGROUND OF THE INVENTION

1. Field of the Invention

The present invention relates to a method and a mobile terminal for searching for messages, and, more particularly, to a method and a mobile terminal for easily and rapidly searching for messages received from or sent to the same phone number of a currently displayed message.

2. Description of the Related Art

Mobile terminals can store a plurality of short messages received from other terminals, as well as those input by the users. Generally, sent messages and received messages are stored separately and in time order, from most recent to oldest. Users check sent or received messages by selecting a sent message box or a received message box in their mobile terminals. When the received message box is selected, all received messages are listed on a display screen in arrival time order, with the more recent message listed first.

Conventionally, short messages stored in a mobile terminal are searched for using the following process. When a user selects a short message menu, the mobile terminal displays sub-menus which include a received message management menu and an inputted/sent message management menu. When the user selects a sub-menu according to the type of short messages to be searched for (e.g. sent messages or received messages), the mobile terminal displays items contained under the selected sub-menu. For example, when the received message management menu is selected, the mobile terminal displays items contained under the received message management menu. When the user selects an item for displaying a list of received messages, the mobile terminal then displays a list of all received messages. The user can scroll up or down the display screen using a direction key to search for a desired short message.

It is assumed that a short message searched for and selected by the user is displayed, as illustrated in FIG. 1(a). If the user presses an up key on the mobile terminal, the display screen will be scrolled up to show the upper or beginning part of the same message, as illustrated in FIG. 1(b). If a down key is pressed, the display screen is scrolled down to show the lower or end part of the same message, as illustrated in FIG. 1(c). If a left key is pressed, a previous message will be displayed, as illustrated in FIG. 1(d). If a right key is pressed, a next message will be displayed, as illustrated in FIG. 1(e).

As explained above, the user can search for a previous or next message using the left or right key when a received short message is displayed. However, conventional mobile terminals do not offer a function to directly move to any previous or next message received from or sent to the same phone number of the currently displayed short message. In order to search for and display any other short message from or to the same phone number, the user has to enter the main message menu. When a list of sent or received messages is displayed, the user has to select an item for "arrangement of messages according to phone numbers." In other words, the user has to press keys many times to search for the messages received from or sent to the same phone number.

SUMMARY OF THE INVENTION

Accordingly, the present invention has been made to solve the above-mentioned problems occurring in conventional systems, and an object of the present invention is to provide a method and a mobile terminal for easily and rapidly searching for any message received from or sent to the same phone number of a currently displayed message.

It is another object of the present invention to provide a method and a mobile terminal for easily and rapidly searching for any previous or next message received from or sent to the same phone number of a currently displayed message.

It is another object of the present invention to provide a method and a mobile terminal for easily and rapidly searching for a message that is either first or last received from or sent to the same phone number of a currently displayed message.

In accordance with one aspect of the present invention for accomplishing the above object, there is provided a mobile terminal that includes a memory for storing at least one message; a key input unit provided with at least one of a left key, a right key, an up key and a down key, for outputting a signal corresponding to a key pressed by a user; a display unit for displaying a message input or selected by the user; and a control unit for detecting when the user inputs a key to search for a previous or next message received from or sent to a same phone number of a currently displayed message, searching for a previous or next message received from or sent to the same phone number according to the key inputted by the user and displaying a detected message on the display unit.

In accordance with still another aspect of the present invention, there is provided a method for searching for short messages in a mobile terminal that includes detecting whether a user inputs a key to select a previous or next message received from or sent to a same phone number of a currently displayed message; searching for the previous or next message received from or sent to the same phone number upon detecting the user's key input; and displaying the detected message on a display unit of the mobile terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
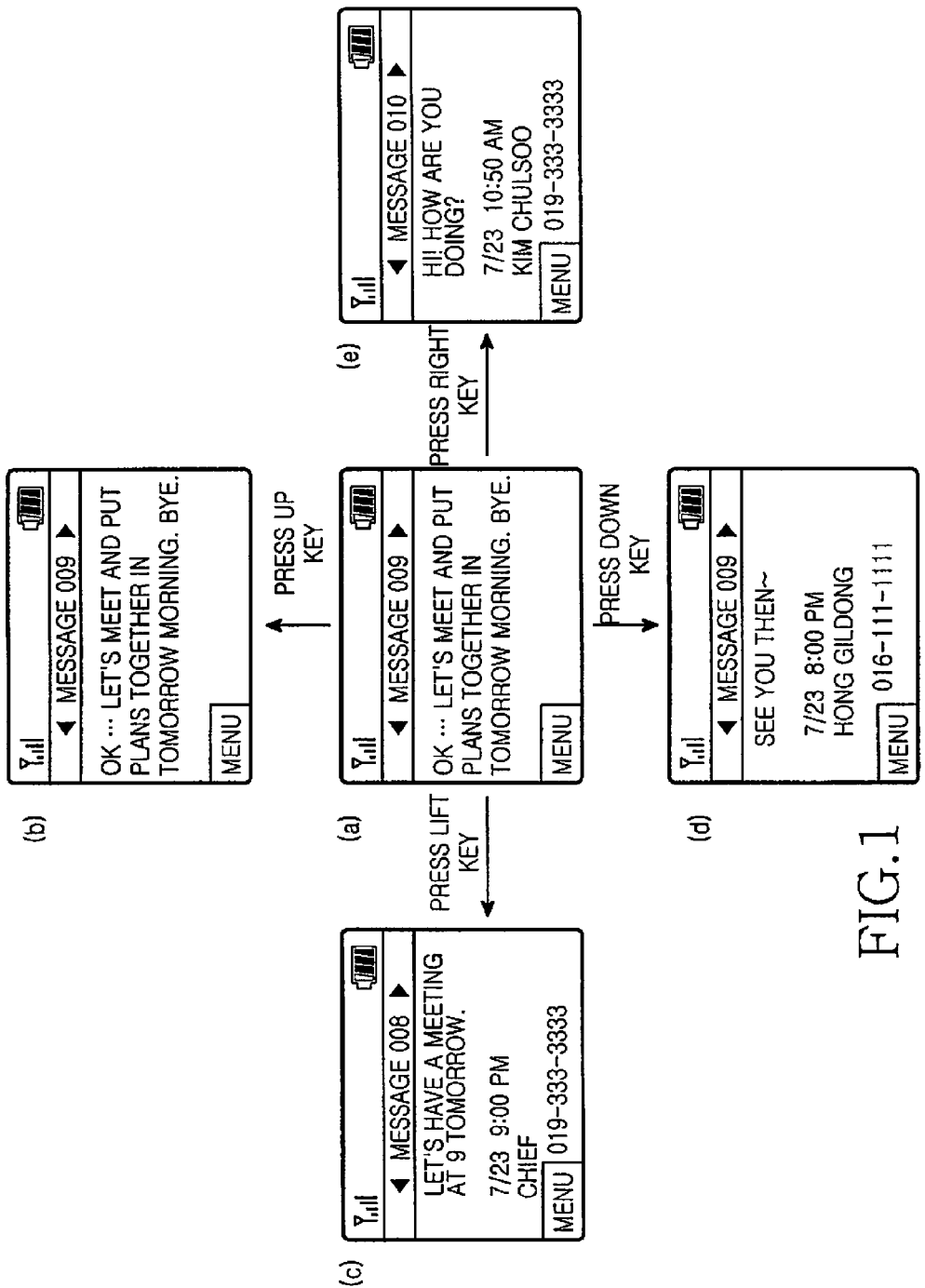
FIGS. 1(a)-(e) are screenshots of a short message searched for and displayed on a mobile terminal.

Hereinafter, preferred embodiments of the present invention will be described with reference to the accompanying drawings. In the drawings, the same element, although depicted in different drawings, will be designated by the same reference numeral or character. Also, in the following description of the present invention, a detailed description of known functions and configurations incorporated herein will be omitted when it may make the subject matter of the present invention unclear.

The present invention provides a method for easily and rapidly searching for a previous or next message received from or sent to the same phone number of a currently displayed short message. Although the embodiments of the present invention described below are based on short message search as an example, they can be also applied to searching of all types of messages including a multimedia message.

Figure 2:
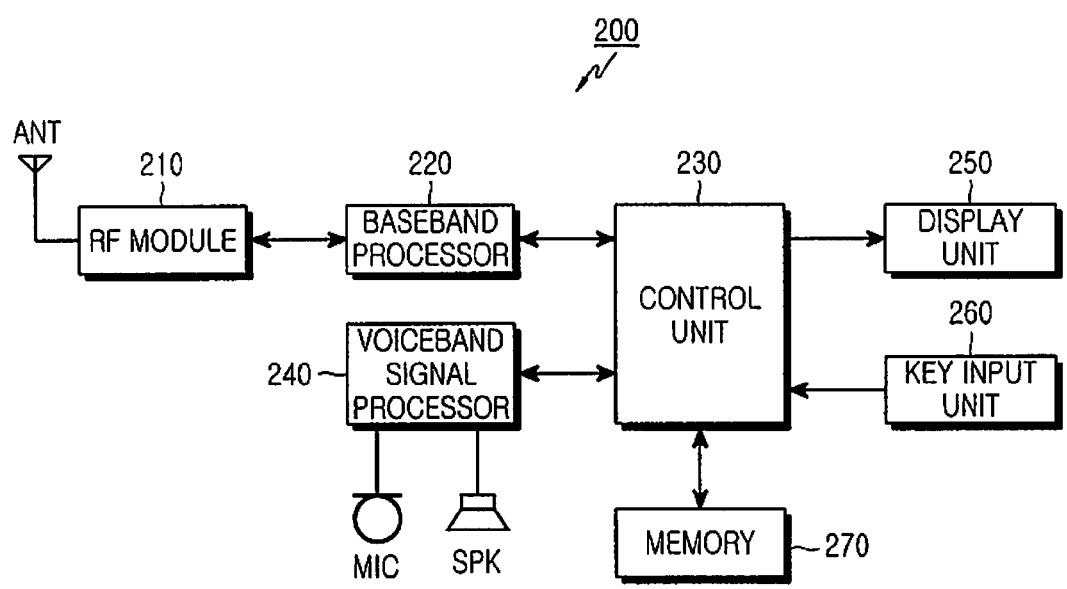
FIG. 2 is a block diagram of a mobile terminal according to a preferred embodiment of the present invention.

FIG. 2 is a block diagram showing the configuration of a mobile terminal which can rapidly search for short messages received from or sent to the same phone number of a currently displayed short message according to the present invention.

Referring to FIG. 2, the mobile terminal 200 includes an RF module 210, a baseband processor 220, a control unit 230, a voiceband signal processor 240, a display unit 250, a key input unit 260 and a memory 270.

The control unit 230 controls overall operations of the mobile terminal 200, including voice communication and data transmission. While a short message selected from a list of received or sent messages is displayed, a user may press a key to search for any other short message received from or sent to the same phone number of the currently displayed short message. Upon detecting user key input, the control unit 230 searches for any short message received from or sent to the same phone number and displays the detected short message on the display unit 250. The controlling operation of the control unit 230 will be explained in more detail with reference to FIGS. 3A to 3C.

The display unit 250 displays various messages or information under the control of the control unit 230. The display unit 250 may comprise an LCD (Liquid Crystal Display), a TFT (Thin Film Transistor) or an organic EL (Electroluminescence).

The key input unit 260 including a plurality of alphanumeric keys and function keys outputs input data corresponding to a key pressed by the user to the control unit 230.

The memory 270 connected to the control unit 230 is composed of a ROM (Read Only Memory) and a RAM (Random Access Memory) for storing a plurality of programs and data necessary to control the operations of the mobile terminal. Particularly, the memory 270 stores at least one text message sent or received and programs for implementing the controlling operation of the control unit 230.

The RF module 210 sends and receives RF signals to and from a base station via an antenna, to perform wireless communication with the base station. The RF module 210 converts a received RF signal into an IF (Intermediate Frequency) signal and outputs the IF signal to the baseband processor 220. Also, the RF module 210 converts an IF signal inputted from the baseband processor 220 into an RF signal and sends the RF signal.

As a BAA (Baseband Analog ASIC) that provides an interface between the control unit 230 and the RF module 210, the baseband processor 220 converts a baseband digital signal applied from the control unit 230 into an analog IF signal and applies the analog IF signal to the RF module 210. The baseband processor 220 converts an analog IF signal applied from the RF module 210 into a baseband digital signal and applies the digital signal to the control unit 230. A voiceband signal processor 240 connected to the control unit 230 is also connected to a microphone MIC and a speaker SPK. The voiceband signal processor 240 converts a voice signal received from the microphone into data and outputs the data to the control unit 230. It also converts voice data input from the control unit 230 into audible sound and outputs the sound to the speaker.

Hereinafter, the controlling operation of the control unit 230 will be explained in detail with reference to FIGS. 3A~3C which are flowcharts showing a process of rapidly searching for a short message according to a preferred embodiment of the present invention.

Referring to FIGS. 2, 3A-3C, while in a standby mode in step 300, the control unit 230 of the mobile terminal determines whether a user inputs a key to display a list of received or sent messages in step 302. More specifically, when the user selects a short message menu on the mobile terminal, the control unit 230 displays sub-menus, such as a received message menu and an inputted/sent message menu. In step 302, the control unit 230 detects whether the user selects one of the sub-menus, i.e. the received message menu or the sent message menu. If the user selects the received message menu or the sent message menu in step 302, the control unit 230 proceeds to step 304 to display a list of received messages or sent messages according to the user's selection.

In step 306, the control unit 230 determines whether the user selects a specific short message from the displayed list. If a short message is selected, the control unit 230 proceeds to step 308 to display the content of the selected short message on the display unit 250.

Then, in step 310, the control unit 230 determines whether a left key or a right key is input in a short press manner. The short press manner refers to a manner of pressing a predetermined key for less than a preset time interval for recognition of the short key pressing.

If the left or right key is pressed in the short press manner, the control unit 230 proceeds to step 312. Otherwise, the control unit 230 proceeds to step 311. In step 312, the control unit 230 searches for and displays a previous or next message corresponding to the pressed key. In other words, the user can search for the previous message using the left key and the next message using the right key, as generally done in a conventional mobile terminal.

Meanwhile, in step 311, the control unit 230 determines whether the left key or right key is input in a long press manner. The long press manner refers to a manner of pressing a predetermined key over a preset time interval for recognition of the long key pressing.

When the left key or right key is input in a long press manner, the control unit 230 proceeds to a procedure "C." Hereinafter, a process in which the control unit 230 proceeds to the procedure "C" after recognizing input of the left key or right key in the long press manner will be discussed with reference to FIG. 3C.

As a result of the determination in step 311, when the left key has been input in the long press manner, the control unit 230 proceeds to step 340, in which the control unit determines if the key input in the long press manner is the left key or the right key.

As a result of the determination in step 340, when the key input in the long press manner is the left key, the control unit 230 proceeds to step 344, in which the control unit 230 searches for a message that is first received from or sent to the same phone number of a currently displayed message, displays the searched message on a screen, and then proceeds to a procedure "B."

Further, as a result of the determination in step 340, when the key input in the long press manner is the right key, the control unit 230 proceeds to step 342, in which the control unit 230 searches for a message that is received last from or sent to the same phone number of a currently displayed message, displays the searched message on a screen, and then proceeds to a procedure "B."

Referring again to FIG. 3A, as a result of the determination in step 311, when the left key or right key is not input in the long press manner, the control unit 230 proceeds to step 314, in which the control unit 230 determines whether an up key or a down key is pressed in a short press manner. If the control unit 230 detects a short press of the up or down key in step 314, it will proceed to step A, as explained in further detail with reference to FIG. 3B.

When a short press of key is detected in step 314, the control unit 230 determines whether the pressed key is the up key or the down key in step 315.

If the up key is pressed in the short press manner, the control unit 230 will proceed to step 316 to determine whether the currently displayed portion is the top-most part of the selected message. If the top-most part is currently displayed, the control unit 230 will proceed to step 320 in order to scroll to and display the bottom-most part of the same message. If the currently displayed portion is not the top-most part of the message, the control unit 230 will then proceed to step 318 in order to scroll to and display a part further up than the currently displayed part in the same message.

If the down key is pressed in the short press manner, the control unit 230 will proceed to step 317 in order to determine whether the currently displayed portion is the bottom-most part of the selected message. If the bottom-most part is currently displayed, the control unit 230 will proceed to step 321 to scroll to and display the top-most part of the same message. If the currently displayed portion is not the bottom-most part of the message, the control unit 230 will then proceed to step 319 in order to scroll to and display a part lower than the currently displayed portion in the same message. After steps 320, 318, 319 and 321, the control unit 230 proceeds to step B, which will be explained in detail with reference to FIG. 3A.

Figure 3A:
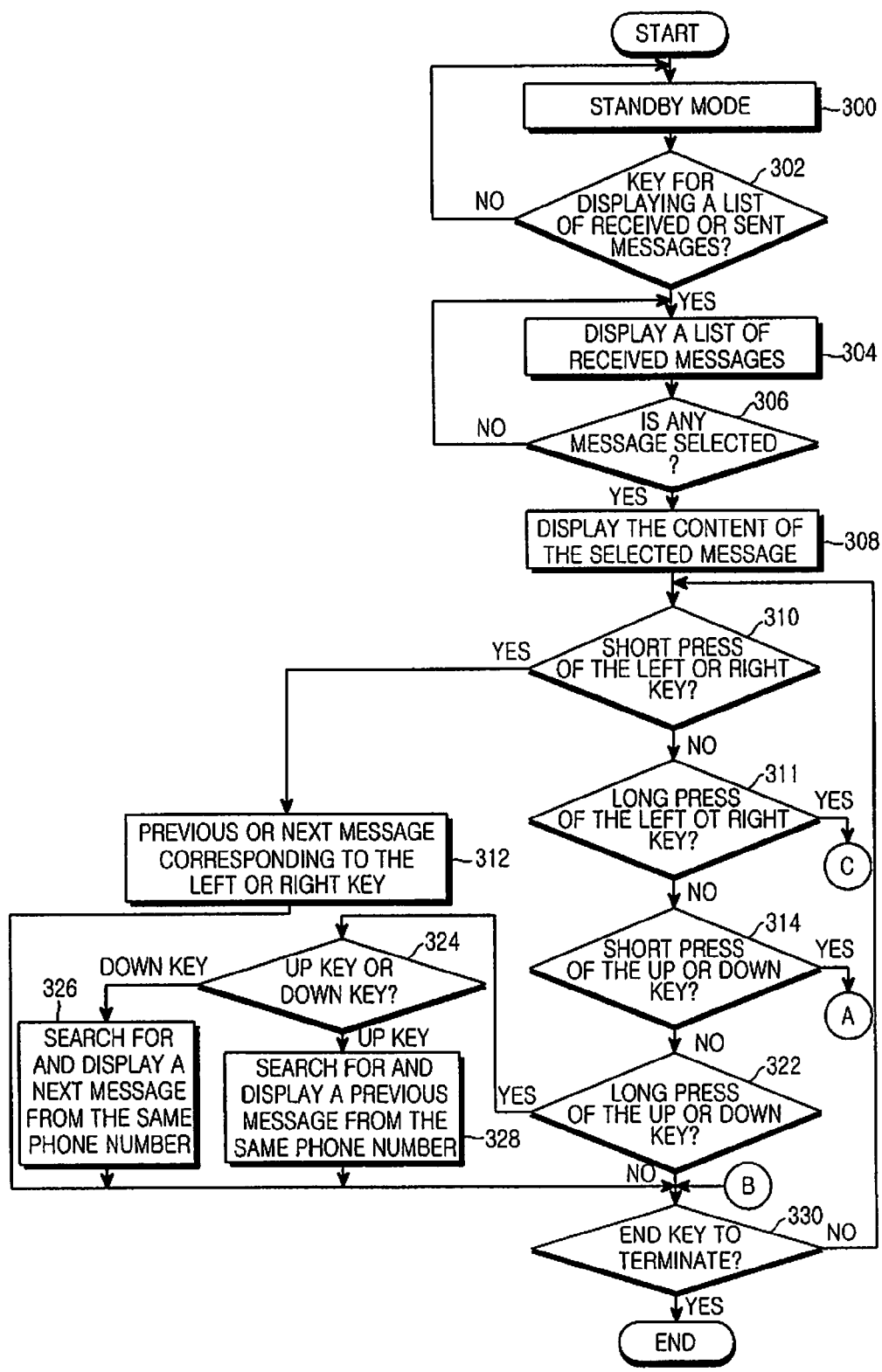
FIGS. 3A-C are flowcharts showing a process of rapidly searching for a short message according to a preferred embodiment of the present invention.
Figure 3B:
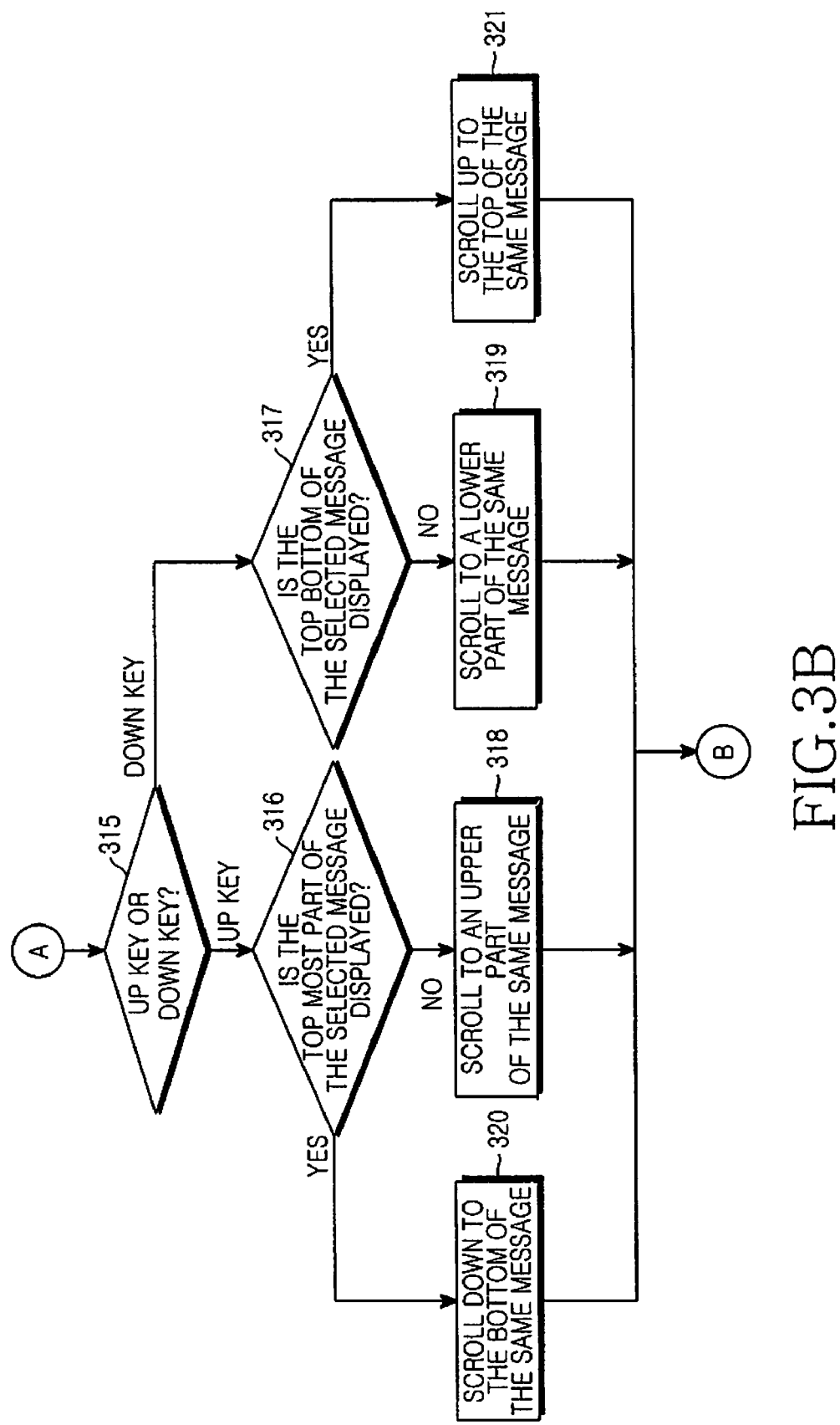
Figure 3C:
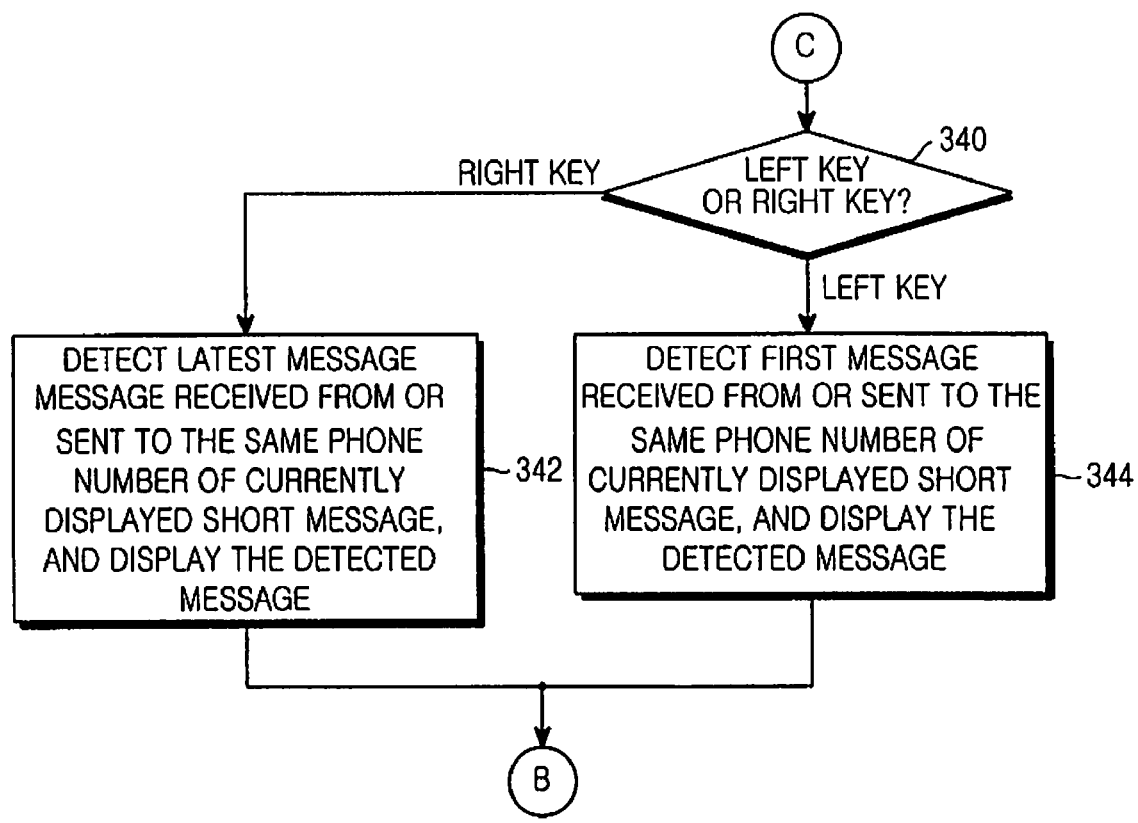

If the up or down key is not pressed in the short press manner in step 314 of FIG. 3A, the control unit 230 will proceed to step 322 in order to determine whether the key is pressed in a long press manner. The long press manner refers to a pressing of a key for longer than a predetermined period of time. If the up or down key is pressed in the long press manner in step 322, the control unit 230 will proceed to step 324. Otherwise, the control unit 230 will proceed to step 330.

In step 324, the control unit 230 determines whether the pressed key is the up key or the down key. If the up key is pressed in the long press manner, the control unit 230 will proceed to step 328 to search for a previous message received from or sent to the same phone number of the currently displayed message and display the detected previous message. If the down key is pressed in the long press manner, the control unit 230 will proceed to step 326 to search for a next message received from or sent to the same phone number of the currently displayed message and display the detected next message.

After step 326, 328, 322 or B, the control unit 230 proceeds to step 330 in order to determine whether the user presses an end key. If the end key is pressed, the control unit 230 will terminate the process of searching for and displaying a short message. Otherwise, the control unit 230 will return to step 310. The process of searching for a short message received from or transmitted to the same phone number of a currently displayed message using the left, right, up and down keys and according to a long press manner as shown in FIGS. 3A to 3C will be explained in further detail with reference to FIGS. 4(a) to 4(i).

Figure 4:
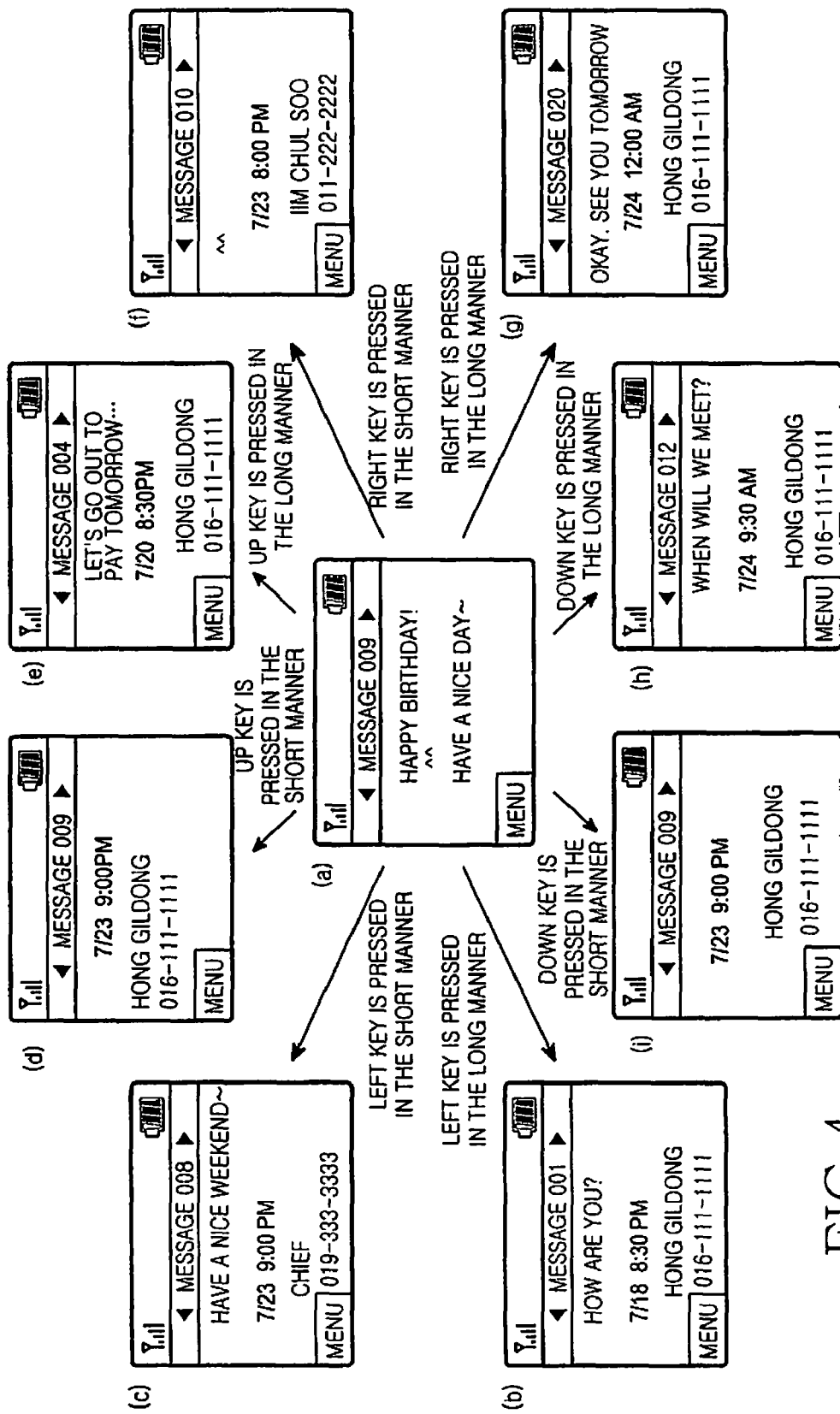
FIGS. 4(a)-4(i) are screenshots of a short message searched for and displayed on a mobile terminal according to a preferred embodiment of the present invention.

It is assumed that a ninth received short messages is selected by the user and currently displayed on the display screen as illustrated in FIG. 4(a). If the left key is pressed in the short press manner during the display of the ninth message as shown in FIG. 4(a), a previous message, i.e. an eighth message, will be displayed as illustrated in FIG. 4(b). If the right key is pressed in the short press manner during the display of the ninth message as shown in FIG. 4(a), a next message, i.e. a tenth message, will be displayed as illustrated in FIG. 4(f). In other words, when the left or right key is input in the short press manner, it is possible to search for the previous or next message transmitted or received just before or just after the currently displayed message, as generally used in a conventional mobile terminal.

Further, when the left key is input in the long press manner in the state where a message as shown in FIG. 4(a) is displayed, a message that is first received from or transmitted to a phone number "016-111-1111" corresponding to the ninth message, which is the currently displayed on a screen, is searched for and displayed. If the message first received from or transmitted to the searched same phone number is the first message, the message as shown in FIG. 4(b) may be displayed. If the user has selected a predetermined message in an item for identifying a currently received message and the message as shown in FIG. 4(a) is then displayed, a message that is first received from the phone number "016-111-1111," which corresponds to the ninth message when the left key has been input in the long press manner, may be searched for and then displayed as shown in FIG. 4(b). Further, when the right key is input in the long press manner in the state where a message as shown in FIG. 4(a) is displayed, a message that is last received from or transmitted to a phone number "016-111-1111" corresponding to the ninth message, which is the currently displayed on a screen, is searched for and displayed. If the message last received from or transmitted to the searched same phone number is the $20^{th}$ message, the message as shown in FIG. 4(g) may be displayed.

Further, if the up key is input in the short press manner in the state where the ninth message is currently displayed on the screen as shown in FIG. 4(a), the display screen is scrolled up to show a part further up than the currently displayed part within the ninth message. However, if the top-most part of the selected message is currently displayed, the display screen will be scroll down to show the bottom-part of the same message, as illustrated in FIG. 4(d). If the user presses the down key in the short press manner during the display of the ninth message, the display screen will be scroll down to show a part lower than the currently displayed part in the same message, as illustrated in FIG. 4(i).

If the user presses the up key in the long press manner during the display of the ninth message, as illustrated in FIG. 4(a), the mobile terminal will search for a previous message received from the same phone number ("016-111-1111") of the currently displayed ninth message. If a fourth message in the list of received messages is the previous message from the same phone number, the mobile terminal will display as illustrated in FIG. 4(c). If the user presses the down key in the long press manner during the display of the ninth message, as illustrated in FIG. 4(a), the mobile terminal will search for a next message received from the same phone number ("016-111-1111") of the currently displayed ninth message. If a twelfth message in the list of received messages is the next message from the same phone number, the mobile terminal will display the tenth message on the display screen, as illustrated in FIG. 4(h).

As described above, the present invention defines a short press manner and a long press manner. Further, according to the present invention, by pressing a left, right, up, or down key in the long press manner, it is possible to directly find a message having the same phone number as that of a currently displayed message.

In a preferred embodiment of the present invention as explained above, the user can view the previous message received from the same phone number of the currently displayed short message by pressing the up key in the long press manner and the next message received from the same phone number by pressing the down key in the long press manner. According to another preferred embodiment of the present invention, the next message from the same phone number can be searched for by the long press of the up key, and the previous message from the same phone number by the long press of the down key. Further, in the present embodiment as explained above, the user can view the message first received from or transmitted to the same phone number of the currently displayed short message by pressing the left key in the long press manner and the message last received from or transmitted to the same phone number by pressing the right key in the long press manner. However, according to another embodiment, the user can view the message last received from or transmitted to the same phone number of the currently displayed short message by pressing the left key in the long press manner and the message first received from or transmitted to the same phone number by pressing the right key in the long press manner. Also, according to the embodiment of the present invention described above, the up key and the down key are used to search for the previous and next messages received from the same phone number of the currently displayed message, and the left key and the right key are used to search for the first and last messages received from the same phone number of the currently displayed message. However, according to another embodiment of the present invention, the left and right keys can be used to search for the previous and next messages received from the same phone number of the currently displayed message, and the up key and the down key can be used to search for the first and last messages received from the same phone number of the currently displayed message. For example, if the left key is pressed in the long press manner during the display of a received short message, the mobile terminal will search for a previous message received from the same phone number of the currently displayed message. If the right key is pressed in the long press manner, the mobile terminal will search for a next message received from the same phone number of the currently displayed message.

Further, according to the embodiment described above, input of the up key and the down key in the long press manner are used to search for the previous and next messages received from the same phone number of the currently displayed message, and input of the left key and the right key in the long press manner are used to search for the first and last messages received from the same phone number of the currently displayed message. However, according to another embodiment of the present invention, only the input of the up key and the down key in the long press manner may be used to search for the previous and next messages or the first and last messages received from the same phone number of the currently displayed message, while input of the left key and the right key may be used in a usual manner. Otherwise, only the input of the left key and the right key in the long press manner may be used to search for the previous and next messages or the first and last messages received from the same phone number of the currently displayed message, while input of the up key and the down key may be used in a usual manner.

It is also possible to use the volume up or down key instead of the long press of the up or down key. For example, if the volume up key is pressed during the display of a received short message, the mobile terminal will search for a previous message received from the same phone number of the currently displayed message. If the volume down key is pressed, the mobile terminal will search for a next message received from the same phone number of the currently displayed message.

As explained above, when the user presses a preset key in a preset key press manner during the display of a received short message, the mobile terminal searches for and displays a previous message, a next message, a first message, or a last message received from the same phone number of the currently displayed message. The mobile terminal enables the user to rapidly and easily search for and identify the messages received from or sent to the same phone number with a simple key pressing, eliminating the need to select the main message menu.

Although preferred embodiments of the present invention have been described for illustrative purposes, those skilled in the art will appreciate that various modifications, additions and substitutions are possible, without departing from the scope and spirit of the invention, as described in the accompanying claims, including the full scope of equivalents thereof.

What is claimed is:

1. A mobile terminal comprising:
    a memory for storing at least one message;
    a key input unit provided with at least one of a left key, a right key, an up key and a down key, for outputting a signal corresponding to a key pressed by a user;
    a display unit for displaying a message input or selected by the user; and
    a control unit for detecting when the user inputs an enhancement input of at least one of the keys to retrieve a previous or next message received from or sent to a same phone number of a currently displayed message, automatically retrieving a previous or next message received from or sent to the same phone number from the at least one message according to the enhancement input of key inputted by the user and displaying the retrieved message on the display unit,
    wherein the enhancement input of the keys operates a special function rather than a normal function of each the left key, the right key, the up key and the down key, and
    wherein the control unit controls the display unit directly to display the retrieved previous or next message received from or sent to the same phone number of the currently displayed message without user selection from a plurality of messages when the enhancement input is detected for longer than a predetermined period of time.

2. The mobile terminal according to claim 1, wherein the control unit recognizes a long press of the up key as a key input requesting retrieval of the previous message received from or sent to the same phone number of the currently displayed message, and a long press of the down key as a key input requesting retrieval of a next message received from or sent to the same phone number of the currently displayed message.

3. The mobile terminal according to claim 1, wherein the control unit recognizes a long press of the down key as a key input requesting retrieval of the previous message received from or sent to the same phone number of the currently displayed message, and a long press of the up key as a key input requesting retrieval of a next message received from or sent to the same phone number of the currently displayed message.

4. The mobile terminal according to claim 1, wherein the control unit recognizes an input of the left key in a long press manner as having an intention of retrieving a previous message transmitted to or received from a phone number corresponding to a currently displayed message, and recognizes an input of the right key in a long press manner as having an intention of retrieving a next message transmitted to or received from a phone number corresponding to a currently displayed message.

5. The mobile terminal according to claim 1, wherein the control unit recognizes an input of the right key in a long press manner as having an intention of retrieving a previous message transmitted to or received from a phone number corresponding to a currently displayed message, and recognizes an input of the left key in a long press manner as having an intention of retrieving a next message transmitted to or received from a phone number corresponding to a currently displayed message.

6. The mobile terminal according to claim 1, wherein, when there is a key input in order to retrieve one of messages first or last transmitted to or received from a phone number corresponding to a currently displayed message, the control unit retrieves for the first message or the last message transmitted to or received from the phone number corresponding to the currently displayed message, and displays a retrieved message on the display unit.

7. The mobile terminal according to claim 6, wherein the control unit recognizes an input of the up key in a long press manner as having an intention of retrieving one of messages first transmitted to or received from a phone number corresponding to a currently displayed message, and recognizes an input of the down key in a long press manner as having an intention of retrieving one of messages last transmitted to or received from a phone number corresponding to a currently displayed message.

8. The mobile terminal according to claim 6, wherein the control unit recognizes an input of the down key in a long press manner as having an intention of retrieving one of messages first transmitted to or received from a phone number corresponding to a currently displayed message, and recognizes an input of the up key in a long press manner as having an intention of retrieving one of messages last transmitted to or received from a phone number corresponding to a currently displayed message.

9. The mobile terminal according to claim 6, wherein the control unit recognizes an input of the left key in a long press manner as having an intention of retrieving one of messages first transmitted to or received from a phone number corresponding to a currently displayed message, and recognizes an input of the right key in a long press manner as having an intention of retrieving one of messages last transmitted to or received from a phone number corresponding to a currently displayed message.

10. The mobile terminal according to claim 6, wherein the control unit recognizes an input of the right key in a long press manner as having an intention of retrieving one of messages first transmitted to or received from a phone number corresponding to a currently displayed message, and recognizes an input of the left key in a long press manner as having an intention of retrieving one of messages last transmitted to or received from a phone number corresponding to a currently displayed message.

11. A method for retrieving a particular message in a mobile terminal while previewing messages, the method comprising:
storing at least one message received from other users;
displaying a message of a particular user among the at least one message;
detecting whether a user inputs an enhanced key to select a previous or next message received from or sent to a same phone number of a currently displayed message of the particular user;
automatically retrieving the previous or next message received from or sent to the same phone number according to the user's enhanced key input; and
directly displaying the retrieved message on a display unit of the mobile terminal without user selection from a plurality of messages when the enhancement input is detected for longer than a predetermined period of time.

12. The method according to claim 11, wherein the step of automatically retrieving comprises retrieving a previous message received from or sent to the same phone number of the currently displayed message when an up key is pressed in a long press manner; and retrieving a next message received from or sent to the same phone number of the currently displayed message when a down key is pressed in the long press manner.

13. The method according to claim 11, wherein the step of automatically retrieving comprises retrieving a previous message received from or sent to the same phone number of the currently displayed message when a down key is pressed in a long press manner; and retrieving a next message received from or sent to the same phone number of the currently displayed message when an up key is pressed in the long press manner.

14. The method according to claim 11, wherein, in the step of automatically retrieving, a previous message transmitted to or received from a phone number corresponding to a currently displayed message is retrieved when the left key is input in a long press manner, and a next message transmitted to or received from a phone number corresponding to a currently displayed message is retrieved when the right key is input in a long press manner.

15. The method according to claim 11, wherein, in the step of automatically retrieving, a previous message transmitted to or received from a phone number corresponding to a currently displayed message is retrieved when the down key is input in a long press manner, and a next message transmitted to or received from a phone number corresponding to a currently displayed message is retrieved when the up key is input in a long press manner.

16. The method according to claim 11, further comprising a step of determining if there is a key input in order to retrieve one of a first message and a last message transmitted to or received from a phone number corresponding to a currently displayed message, after the step of retrieving.

17. The method according to claim 16, wherein, in the step of automatically retrieving, one of messages first transmitted to or received from a phone number corresponding to a currently displayed message is retrieved when the up key is input in a long press manner, and one of messages last transmitted to or received from a phone number corresponding to a currently displayed message is retrieved when the down key is input in a long press manner.

18. The method according to claim 16, wherein, in the step of automatically retrieving, one of messages first transmitted to or received from a phone number corresponding to a currently displayed message is retrieved when the down key is input in a long press manner, and one of messages last transmitted to or received from a phone number corresponding to a currently displayed message is retrieved when the up key is input in a long press manner.

19. The method according to claim 16, wherein, in the step of automatically retrieving, one of messages first transmitted to or received from a phone number corresponding to a currently displayed message is retrieved when the left key is input in a long press manner, and one of messages last transmitted to or received from a phone number corresponding to a currently displayed message is retrieved when the right key is input in a long press manner.

20. The method according to claim 16, wherein, in the step of automatically retrieving, one of messages first transmitted to or received from a phone number corresponding to a currently displayed message is retrieved when the right key is input in a long press manner, and one of messages last transmitted to or received from a phone number corresponding to a currently displayed message is retrieved when the left key is input in a long press manner.

* * * * *